Oct. 10, 1972  M. GAUTHRON  3,697,377
VENTED NUCLEAR FUEL ELEMENT
Filed July 8, 1968  2 Sheets-Sheet 2

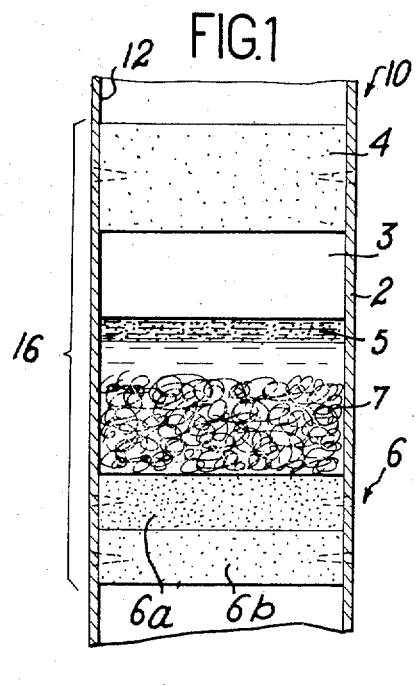
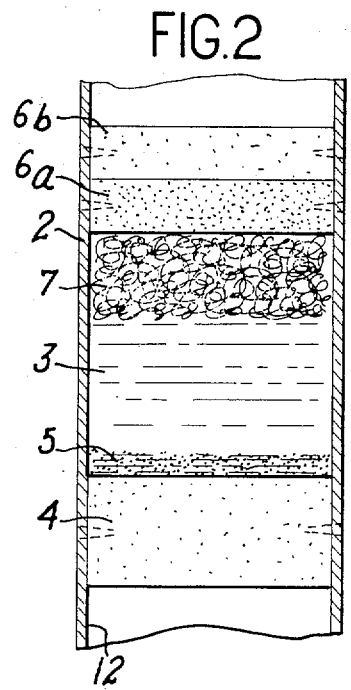
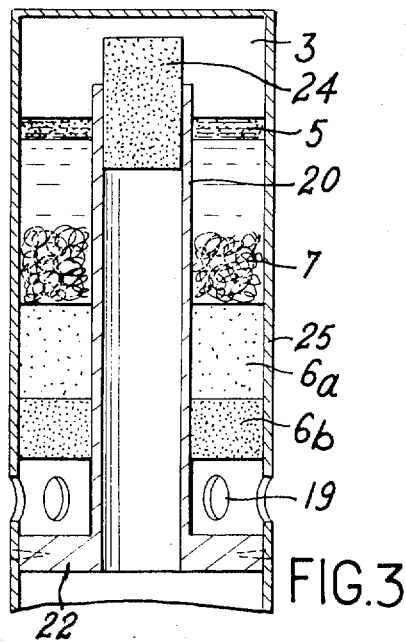

INVENTOR
MAURICE GAUTHRON
BY Craig & Antonelli
ATTORNEYS 3,697,377
VENTED NUCLEAR FUEL ELEMENT
Maurice Gauthron, Paris, France, assignor to
Commissariat a l'Energie Atomique
Filed July 8, 1968, Ser. No. 743,125
Claims priority, application France, July 13, 1967,
114,361
Int. Cl. G21c 3/10
U.S. Cl. 176—79                                                16 Claims

ABSTRACT OF THE DISCLOSURE

A vented fuel element for a nuclear reactor of the liquid-metal cooled type is designed to prevent the penetration of the liquid metal coolant into the fuel element can through the fission-gas discharge vent.

The vent according to the invention comprises a compartment which is separated from the can interior by a first porous plug and from the liquid metal by a second porous plug.

The liquid metal which has passed through the second plug is intended to transport a powdered product which is present within the compartment either into the first plug which is thereby rendered impermeable to the liquid metal or in the direction of the second plug so as to bring the powdered product into contact with the second plug and thus permit the discharge of fission gases.

---

The present invention relates to a nuclear fuel element which is provided with a vent for the release of fission gases which are produced during irradiation in the fuel material, a fuel element of this type being primarily intended to be employed in reactors which are cooled by circulation of an alkali metal or an alkali-metal eutectic (usually sodium), whilst the fuel usually consists of a ceramic material. Fuel elements of this type must permit the discharge of fission gases while preventing the admission of liquid metal into the fuel element.

The invention is directed to the design concept of a fuel element which satisfies these conditions while retaining a simple structure and which in particular no longer entails the presence within said fuel element of ducts of substantial length as have been proposed up to the present time by reason of the substantial variations in the sodium level within the reactor.

To this end, the invention proposes a fuel element for a nuclear reactor which is cooled by a circulation of liquid alkali metal and comprising a mass of fuel material contained within a vertical can of elongated shape provided with a vent for the discharge of fission gases, said fuel element being characterized in that the vent comprises a vertical tube which is integral with the end portion of the fuel can, a first plug of porous material which is placed within said tube, a compartment which is closed at one end by said first plug and separated from the liquid metal coolant at the other end by a second plug of porous material and, inside the compartment, a powdered product in contact with a layer of liquid metal which has passed through the second plug, the first plug being rendered impermeable to said liquid metal when said product is brought into contact therewith and said second plug being intended to permit the discharge of fission gases when said product is brought into contact therewith.

The powdered material can produce action by means of a number of processes, in particular by mechanical clogging (the porous plug being intended to play the part of a microscopic valve) and/or by increasing the surface tension (anti-wetting action). When the liquid metal is sodium, the powdered material can especially be $Na_2O$. Use can also be made of inert powders of alkali metal oxides or alkaline-earth metal oxides, of alumina, silica or others (such as MgO, for example) which have a very fine particle size ranging from 1 micron to $0.01\mu$ and which close the pores.

It is apparent that the discharge of fission gases takes place only when the pressure of said gases has displaced the liquid metal coolant and this latter is consequently no longer in contact with the first plug, said discharge being delayed by the time of build-up of said gases within the can. Said build-up time is sufficient to result in partial radioactive decay prior to discharge.

A better understanding of the invention will be gained from the following description of modes of application which are given by way of example without any limitation being implied, reference being made to the accompanying drawings, in which:

FIG. 1 is a very diagrammatic view of the lower portion of a vented fuel element;

FIG. 2 is a very diagrammatic view of the upper portion of a vented fuel element;

FIG. 3 is a very diagrammatic view of an alternative form of construction of the top portion of the fuel element;

Figure 4:
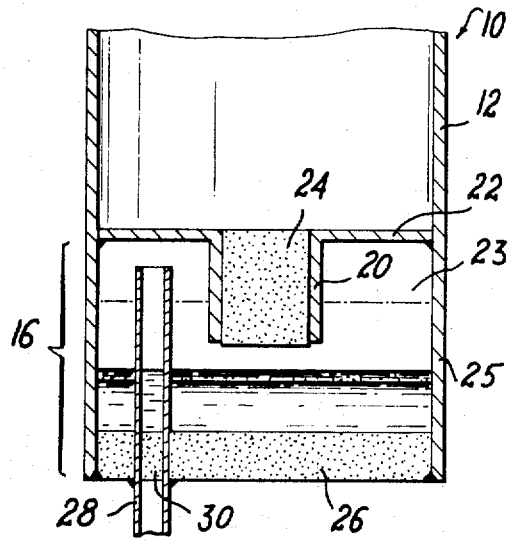
FIG. 4 is another very diagrammatic view of the lower portion of a vented fuel element in an alternative form of construction.

The fuel element 10, one extremity of which is shown in the figures, comprises a can 12 of elongated shape which contains the fuel material (usually either uranium oxide or plutonium or both). That extremity of said can which is not illustrated is hermetically closed whilst the extremity which is illustrated is provided with a vent in accordance with the invention.

Said fuel element can be grouped together with other fuel elements at the nodes of a uniform lattice within a sleeve which has not been illustrated and through which is established a vertical circulation of liquid sodium constituting the coolant. The sleeve and the fuel elements contained therein constitute a fuel assembly which can be handled as a single unit.

The vent 16 comprises a vertical tube 2 which, in the case of FIG. 1, is disposed in the line of extension of the lower portion of the can 12. Inside said tube 2, a plug 4 formed of porous material forms a separation between the interior of the can 12 and a compartment 3, said compartment being closed at the other end by a second plug 6 and separated by means of this latter from the liquid metal coolant which circulates around the fuel element. As is the case with the plug 4, said plug 6 is permeable to fission gases and to sodium when this latter is in the pure state. However, the pore size of the material which forms the plug 4 is such that said plug becomes impermeable to liquid sodium when this latter is loaded with a product which increases the surface tension of the sodium or which has a suitable grain size.

The plug 6 is preferably constituted by a succession of layers 6a, 6b of material having decreasing pore sizes from the compartment 3 to the exterior of the tube 2 whilst the pores of the outer materials nevertheless remain of larger size than those of the material of the plug 4. For example, the plug 4 is formed of a ceramic material such as MgO, $Al^2O^3$ having pores 0.05 to 0.1$\mu$ in diameter or of a sintered material having a nickel base and pore diameters of 0.10 to 0.50$\mu$ whilst the outer layer 6b is formed of a material having pore diameters of 1 to 5$\mu$ and the inner layer 6a has pore diameters of 10 to 20$\mu$.

Prior to placing the fuel element in the reactor, the product which is intended to render the plug 4 impermeable is dispersed within the compartment 3. The product referred-to can be constituted in particular by sodium monoxide $Na_2O$ or by any other powder which is capable of performing together with the plug 4 the function of a microscopic valve.

Inside the compartment 3, the plug 6 is covered by a packing 7 of stainless steel wool or any suitable material of similar type which is capable of holding-up the dispersed product while retaining a sufficient degree of permeability to permit the free passage of fission gases in the direction of the liquid metal, that is to say through the plug 6.

The operation of the device has been brought out by the foregoing description and will therefore be explained only briefly. The fuel element 10 which is fitted with the vent is placed in the vertical position in the mass of liquid sodium which constitutes the reactor coolant, the compartment 3 being filled with an inert gas. The pure liquid sodium penetrates into said compartment 3 through the plug 6. The inert gas contained in the compartment is gradually compressed by the sodium and is loaded with sodium monoxide progressively as it is admitted. The sodium then comes into contact with the plug 4 but its level continues to rise until the moment when the gas pressure within the compartment balances the pressure of sodium. The free level then remains stationary. The admission of sodium into the fuel element is prevented by the porous plug 4 which has become impermeable when it is immersed in the top part of the liquid sodium which is loaded with oxide.

At the time of operation of the reactor, fission gases collect within the can and the pressure of said gases increases progressively. Said fission gases progressively drive out the sodium monoxide which obstructs the pores of the plug 4 according to a process which is similar to that which is employed for cleaning clogged filters by passing a gas stream in the direction opposite to the flow of the fluid which has previously been filtered. The fission gases flow into the compartment 3 and displace the free level of sodium downwards. Said free level thus reaches the packing 7 which holds up the powdered product but nevertheless retains sufficient porosity to permit the flow of fission gases which continue to force the sodium through the layers 6a and 6b. The decreasing dimensions of the pores of said layers produce a filtering action both on the downwardly-displaced sodium and on the fission gases which are discharged through the liquid sodium which is circulated around the fuel element.

As shown in FIG. 2, a vent 16 which is carried at the top portion of the can 12 is formed in the same manner. A plug 4 closes the can 12 whilst a plug 6 isolates the compartment 3 from the liquid metal coolant. The underface of the layer 6a is covered with a packing of stainless steel wool and a sealing product is dispersed within the compartment 3. Said product obstructs the plug 4 as long as the pressure of the fission gases is lower than that of the liquid metal coolant and is forced out by said gases into the packing 7 when said pressure increases and permits the displacement of the liquid sodium. The gases are then discharged through the packing 7 and the plug 6.

An alternative form of construction of a vent 16 which is carried by the top portion of the can 12 is shown in FIG. 3. In fact, in this figure, the vent 16 comprises a vertical tube 20 provided with a radial flange 22 which is secured to the can 12 in leak-tight manner, for example by welding. The tube 20 is closed by a porous plug 24 and is mounted at the center of a duct 25 which forms an extension of the can 12. Said duct is closed above the plug 24 and pierced at the lower end above the flange 22 by openings 19 through which the fission gases are intended to be discharged and which provide a communication with the liquid metal. Said openings 19 are separated from the compartment 3 and from the plug 24 by a plug 6 which is similar to that of FIGS. 1 and 2 and above which is placed a packing 7. The product 5 which is contained in the compartment 3 is therefore displaced upwards to the level of the plug 24 so as to obstruct this latter as long as the pressure of the fission gases is either equal to or lower than that of the liquid metal. The product is then forced down with said liquid metal into the packing 7 in order to permit the discharge of the fission gases through said packing, through the porous layers 6a and 6b and then through the openings 19.

Figure 5:
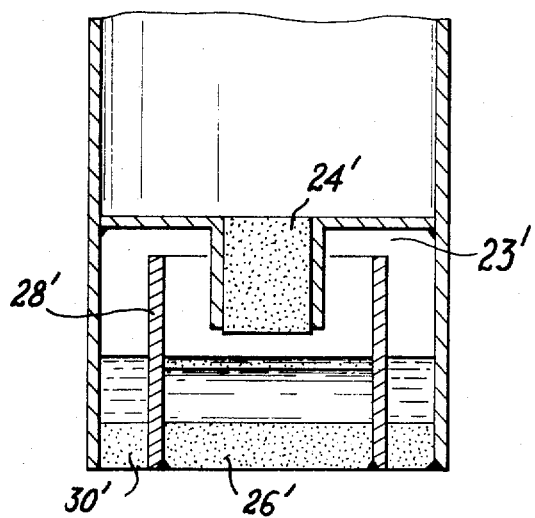
FIG. 5 is a detail view which is also very diagrammatic and shows an alternative form of construction of the vent of FIG 4.

However, it may sometimes prove preferable to make use of a discharge duct which is different from said can extension 25. Two forms of construction of said duct are shown in FIGS. 4 and 5 and show the lower ends of a fuel element which is provided with a vent 16. A discharge pipe 28 is accordingly disposed parallel to the tube 20 inside the cylindrical can extension 25 which is closed by the porous plug 26, said plug being intended to form a separation between the compartment 23 and the liquid metal which is circulated within the fuel assembly. The pipe 28 therefore provides a communication between the top portion of the compartment 23 and the mass of liquid sodium which flows around the fuel element but has its opening in the liquid sodium at a level below that of the plug 26. The pipe is closed by a porous plug 30 which, together with the plug 26, can be formed in the same manner as the plug 6 and covered by a packing 7 or which can alternatively be formed of a material having a porosity which is similar to that of the plug 4. The product is accordingly dispersed within the single compartment 23 and not within the pipe 28. The upper extremity of said pipe has its opening above the highest level reached by said product, that is to say within the space located above the chain-dotted line of FIG. 4 in which the inert gas is compressed.

When the reactor is in operation and the fission gases displace the free level of sodium downwards, the plug 26 is clogged by the loaded sodium but the gases are discharged through the pipe 28 whose plug is not clogged and only performs the function of a filter.

In the form of construction shown in FIG. 5, the plugs 24' and 26' are again shown. The discharge pipe 28' is constituted by an annular passageway which is also closed by a plug 30'. The clogging product (sodium monoxide $Na_2O$ in the form of a powder which can be dispersed in the sodium in the form of a surface film) is placed in the central portion of the compartment 23' prior to introduction of the fuel element in the reactor and the plug 30' is never clogged.

The powdered product can consist either of impurities which are usually transported by the liquid metal coolant such as, for example, sodium monoxide $Na_2O$ when the reactor is cooled by a circulation of liquid sodium or of a powder having a very small particle size of the order of 1$\mu$ to 0.01$\mu$, for example, of an alkali metal oxide or an alkaline-earth metal oxide, of silica, alumina or any like material which is capable of clogging the plug 4.

Whatever form of construction is chosen, the closure of the vent is ensured as long as the fission gases have not attained a pressure in excess of the liquid metal coolant pressure whereas opening of the vent is carried out automatically when there is no danger of penetration of the metal into the can and when it is necessary to discharge the fission gases.

What we claim is:

1. A vented fuel element for a nuclear reactor which is cooled by the circulation of a liquid alkali metal, said fuel element comprising a mass of fuel material disposed in a fuel container and a tube means which is fast with one end portion of the fuel container, said tube means containing a vent means, wherein said vent means comprises a first plug means of porous material and a second plug means of porous material, said first and second plug means defining a chamber therebetween, the first plug means being in fluid communication with fission gas and the second plug means being in fluid communication with the circulating liquid metal and permeable to said liquid metal, a powdered material disposed in said chamber, and a packing material supporting said powdered material adjacent said second plug means, said powdered material rendering the first plug means impermeable to said liquid metal when said powdered material is brought into contact therewith, the second plug means being permeable to said discharge of fission gases when said powdered material is brought into contact therewith.

2. The vented fuel element of claim 1, wherein the powdered material has a particle size of about 1 to $0.01\mu$.

3. The vented fuel element of claim 1, wherein the second porous plug has two successive layers of material having decreasing pore size in the direction of the circulating liquid metal, the layer facing the chamber having a pore size diameter of about 10 to $20\mu$ and the layer facing the circulating liquid metal having a pore size diameter of about 1 to $5\mu$.

4. The vented fuel element of claim 3, wherein the first porous plug is selected from the group consisting of magnesium oxide and alumina having a pore size diameter of about 0.05 to $0.1\mu$.

5. The vented fuel element of claim 3, wherein the first porous plug is a sintered material having a nickel base and a pore size diameter of about 0.01 to $0.50\mu$.

6. A fuel element in accordance with claim 1, wherein the powdered material is sodium monoxide and the liquid metal coolant is sodium.

7. A fuel element in accordance with claim 1, wherein the powdered material is of such nature as to form a surface film on the metal coolant introduced into the chamber.

8. A fuel element in accordance with claim 1, wherein the powdered material is selected from the group consisting of an alkali metal oxide, an alkaline-earth metal oxide, alumina, silica and magnesium oxide.

9. A fuel element in accordance with claim 1, wherein the packing material is provided for retaining the powdered material in the chamber and is constituted by stainless steel wool.

10. A fuel element in accordance with claim 1, wherein the second porous plug contains a plurality of layers of materials having pore sizes which are progressively smaller towards the exterior.

11. A vented fuel element for a nuclear reactor which is cooled by the circulation of a liquid alkali metal, said fuel element comprising a mass of fuel material disposed in a fuel container and a tube means which is fast with one end portion of the fuel container, said tube means containing a vent means, wherein said vent means comprises a first plug means of porous material and a second plug means of porous material, said first and second plug means defining a chamber therebetween, the first plug means extending into said chamber and being in fluid communication with fission gas and the second plug means being in fluid communication with the circulating liquid metal and permeable to said liquid metal, a powdered material disposed in said chamber, said powdered material rendering the first plug means impermeable to said liquid metal when said powdered material is brought into contact therewith, and a discharge tubular member extending through the second porous plug means into the chamber, the tubular member being closed by a portion of the second porous plug means and the interior of the tubular member being free of the powdered material, the arrangement being such that, in use, the end of the discharge tubular member within the chamber opens into a region of said chamber which is above the lower extended portion of the first porous plug means and above the maximum level attained by liquid metal containing entrained powdered material.

12. A fuel element according to claim 11, wherein the axes of the tubular member and the vent means are parallel, one being spaced laterally from the other.

13. The fuel element of claim 11, wherein the first porous plug means is axially disposed in the vent means and is spaced apart from the walls of the vent means whereas the second porous plug means extends across the entire vent means.

14. A vented fuel element for a nuclear reactor which is cooled by the circulation of a liquid alkali metal, said fuel element comprising a mass of fuel material disposed in a fuel container and a tube means which is fast with one end portion of the fuel container, said tube means containing a vent means, wherein said vent means comprises a first plug means of porous material and a second plug means of porous material, said first and second plug means defining a chamber therebetween, the first plug means extending into said chamber and in fluid communication with fission gas and the second plug means being in fluid communication with the circulation liquid metal and permeable to said liquid metal, a powdered material disposed in said chamber, said powdered material rendering the first plug means impermeable to said liquid metal when said powdered material is brought into contact therewith, and a tubular member extending through the second porous plug means into the chamber, forming a central zone and an annular zone in said chamber, the tubular member and the vent means being coaxially disposed, the end of the tubular member within the chamber surrounding the free end portion of the first porous plug means, said annular zone and central zone being closed by the second plug means, the annular zone being free of said powdered material, the arrangement being such that, in use, the end of the tubular member within the chamber opens into a region of the chamber which is above the lower portion of the first porous plug means and above the maximum level attained by liquid metal containing entrained powdered material.

15. The fuel element of claim 14, wherein the first porous plug means is axially disposed in the vent means and is spaced apart from the walls of the vent means whereas the second porous plug means extends across the entire vent means.

16. A vented fuel element for a nuclear reactor which is cooled by the circulation of a liquid alkali metal, said fuel element comprising a mass of fuel material disposed in a fuel contained and a tube means which is fast with one end portion of the fuel container, said tube means containing a vent means, wherein said vent means comprises a conduit means coaxially disposed in said vent means defining an axial zone and an annular zone, one end of said axial zone being in fluid communication with fission gas and the other end terminating in a chamber defined by a first porous plug means provided in said other end of the axial zone and a second porous plug means disposed in said annular zone, a powdered material disposed in the annular zone of said chamber, and a packing material supporting said powdered material adjacent said second porous plug means, said powdered material rendering the first plug means impermeable to said liquid metal when said powdered material is brought into contact therewith, the second plug means being permeable to the discharge of fission gases when said powdered material is brought into contact therewith and aperture means disposed in the tube means on that side of the second porous plug means which is in said communication with the circulating liquid metal.

References Cited

UNITED STATES PATENTS

| | | | |
|---|---|---|---|
| 3,010,889 | 11/1961 | Fortescue et al. | 176—37 X |
| 3,157,580 | 11/1964 | Williams | 176—80 X |
| 3,196,083 | 7/1965 | Hosegood et al. | 176—37 |
| 3,219,538 | 11/1965 | Glueckauf et al. | 176—37 |
| 3,235,466 | 2/1966 | Williams et al. | 176—68 |
| 3,238,105 | 3/1966 | McNelly | 176—37 |
| 3,356,585 | 12/1967 | Zerbroski | 176—68 |
| 3,399,112 | 8/1968 | Dodd | 176—37 X |
| 3,406,094 | 10/1968 | Beisswenger et al. | 176—68 X |
| 3,446,703 | 5/1969 | Lyons et al. | 176—68 X |

CARL D. QUARFORTH, Primary Examiner

G. G. SOLYST, Assistant Examiner

U.S. Cl. X.R.

176—68